No. 755,470. Patented March 22, 1904.

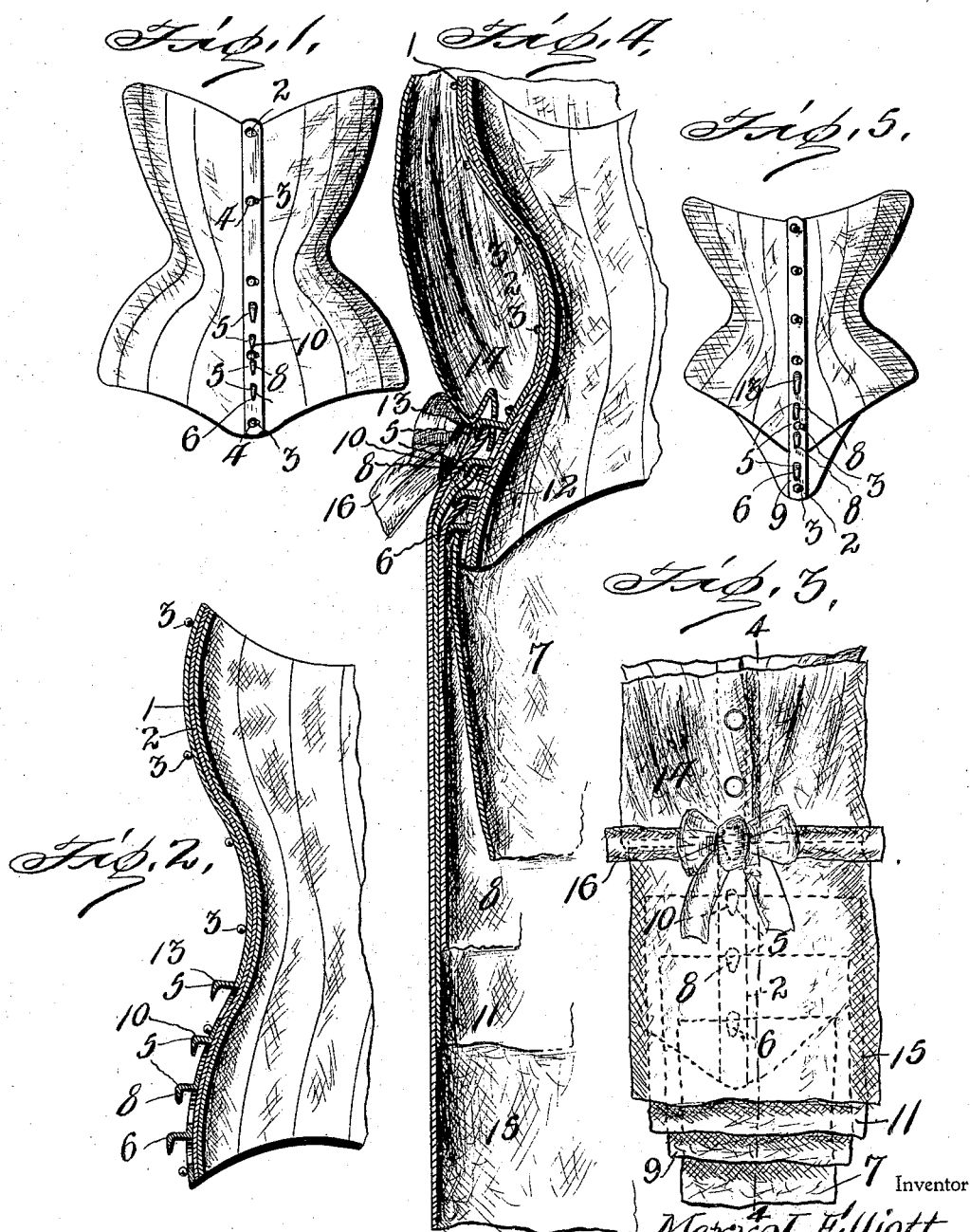

UNITED STATES PATENT OFFICE.

MARY JANE ELLIOTT, OF PORT HURON, MICHIGAN.

CORSET.

SPECIFICATION forming part of Letters Patent No. 755,470, dated March 22, 1904.

Application filed November 12, 1903. Serial No. 180,948. (No model.)

*To all whom it may concern:*

Be it known that I, MARY JANE ELLIOTT, a citizen of the United States, residing at Port Huron, in the county of St. Clair and State of Michigan, have invented certain new and useful Improvements in Corsets; and I do declare the following to be a full, clear, and exact description of the invention, such as will enable others skilled in the art to which it appertains to make and use the same.

My invention relates to certain new and useful improvements in corsets.

The object of my invention is to provide the corset with an integral or non-removable fastening means for holding the skirt and shirt-waist in their adjusted positions and for producing the much-desired long-waisted effect, thereby doing away with all separate or removable attachments for the corsets.

With the above and other objects in view the invention consists of certain novel features of construction, combination, and arrangement of parts, as will be more fully described, and particularly pointed out in the appended claims.

In the accompanying drawings, Figure 1 is a front view of my improved corset. Fig. 2 is a vertical sectional view through the same. Fig. 3 is a detail front view showing the application of my invention. Fig. 4 is a vertical section taken on the line 4 4 of Fig. 3. Fig. 5 is a front view of a modified form of my invention.

In the embodiment of my invention as illustrated in Figs. 1 to 4 of the drawings, the numerals 1 and 2 denote the two front fastening-stays of a corset, preferably of the long-waisted style. Said stays are secured together to close the front of the corset in the usual manner, the under stay 1 having headed studs 3, which are engaged by key-shaped openings 4 in the upper stay 2. Upon the front of the upper stay 2, adjacent to its lower end and below the waist-line of the corset, is a vertical series of hooks 5, which are adapted to engage the various garments and hold them in their adjusted positions. Any desired number of these hooks 5 may be provided and they may all be of the same size, but I preferably make the top one a little larger. They may be formed integral with the said top stay by stamping them up from the same or they may be formed independently and then attached rigidly to the stay by rivets or other fastening means. As shown, four hooks are provided, and their use is preferably as follows: The lowermost one 6 engages the drawers 7 of the wearer, the second hook 8 engages the short underskirt or petticoat 9, the third hook 10 engages the long underskirt 11 and the bustle-strings 12, and the uppermost hook 13 is engaged by a buttonhole in the shirt-waist 14, the top or overskirt 15, and the belt 16.

In Fig. 5 of the drawings I have shown the application of my invention to a short-waisted or girdle corset. Either one or both of the front stays in this corset are extended, as at 9, below the bottom edge of the corset, and the hooks 5 are carried by this extended portion of the stay or stays.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. A corset-stay provided with fastening elements for connection with complementary elements upon a companion stay and having hooks stamped up therefrom to engage and retain nether garments in their adjusted positions, substantially as described.

2. A corset having upon the lower portion of its front fastening-stay a series of hooks stamped up therefrom, said hooks being relatively arranged to engage different articles of wearing-apparel in their adjusted positions, substantially as described.

3. A corset provided with stays having fastenings for engagement with each other, one of said stays being longer than the other, forming an extension projecting below the lower edge of the corset, said extension carrying garment-engaging devices, substantially as described.

In testimony whereof I have hereunto set my hand in presence of two subscribing witnesses.

MARY JANE ELLIOTT.

Witnesses:
 ELLEN ROSS,
 JOS. RUPPEL.